W. K. HOWE.
CIRCUIT CONTROLLER.
APPLICATION FILED JUNE 9, 1916.
Reissued June 5, 1917. 14,310.
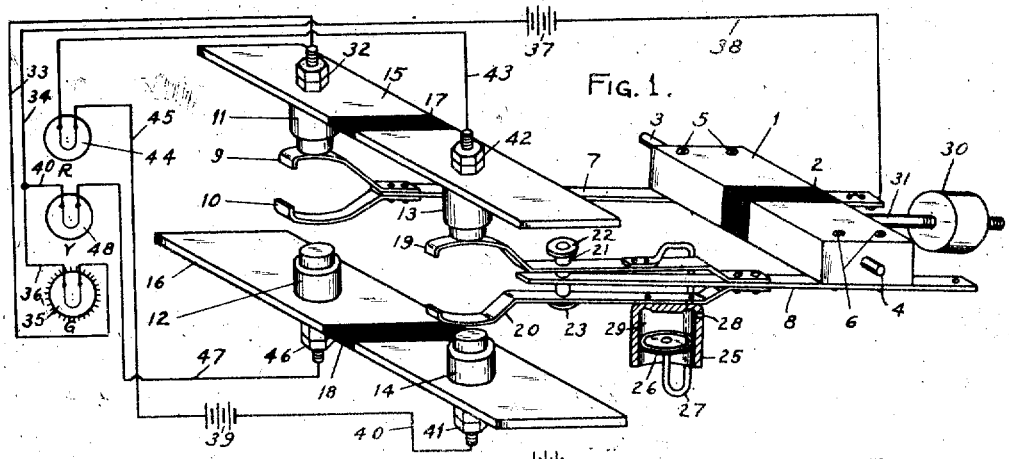
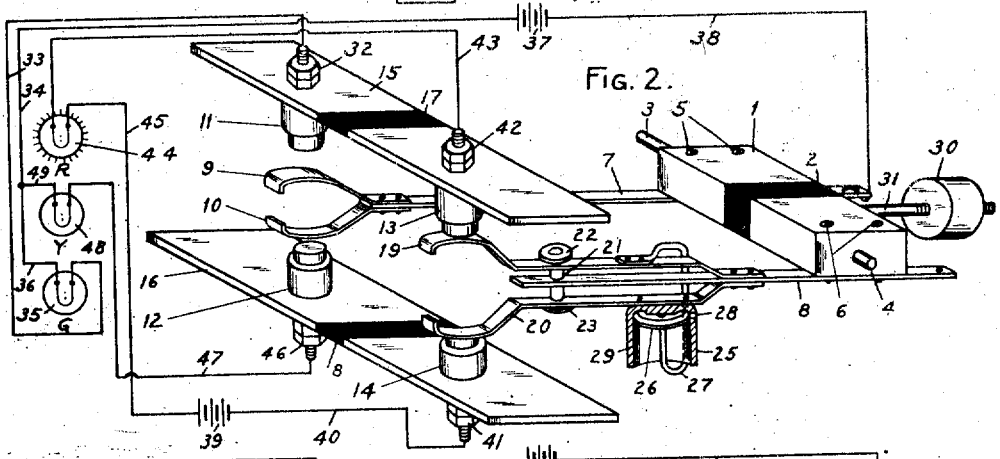
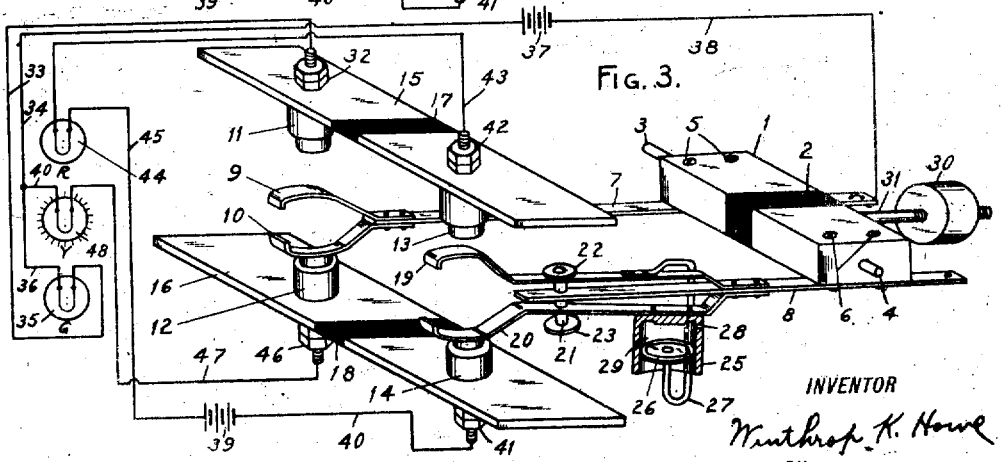
INVENTOR
Winthrop K. Howe
BY
Lyman E. Dodge
ATTORNEY.

UNITED STATES PATENT OFFICE.

WINTHROP K. HOWE, OF ROCHESTER, NEW YORK, ASSIGNOR TO GENERAL RAILWAY SIGNAL COMPANY, OF GATES, NEW YORK, A CORPORATION OF NEW YORK.

CIRCUIT-CONTROLLER.

14,310. Specification of Reissued Letters Patent. Reissued June 5, 1917.

Original No. 1,180,720, dated April 25, 1916, Serial No. 202,854, filed November 25, 1913. Application for reissue filed June 9, 1916. Serial No. 102,781.

*To all whom it may concern:*

Be it known that I, WINTHROP K. HOWE, a citizen of the United States, and a resident of the city of Rochester, in the county of Monroe and State of New York, have invented a new and useful Circuit-Controller, of which the following is a specification.

This invention relates to a circuit controller and more particularly to a circuit controller having three operative positions. Such a circuit controller is most used in what is known as a "three-position relay", employed in railway signaling, but the invention may be used in other situations or under other conditions, where its novel features may be availed of advantageously.

The more special object of this invention is to provide a simple and efficient three-position relay or circuit controller capable of preventing the flashing or operation of a "danger" signal lamp or device in the time interval between lighting or operating respective "clear" and "caution" signal lamps or devices, and to assure lighting or operation of the "danger" signal lamp or device when or after the "clear" and "caution" lamps or devices are extinguished or inoperative.

Another object of the invention is the construction of a circuit controller of the kind specified which can be used for closing a circuit in the central or mid position of the three positions which the circuit controller is adapted to assume.

Another object of the invention is to provide a construction and arrangement of parts which will prevent closing of the circuit which is closed by the circuit controller when in its mid position by a complete movement of the circuit controller from either one of its extreme positions to the other.

Other objects and advantages will appear as the description of the invention progresses, and the novel features of the invention will be particularly pointed out in the appended claims.

In describing the invention in detail, reference is had to the accompanying drawing, wherein I have illustrated one physical embodiment of my invention, and wherein like characters of reference designate corresponding parts throughout the several views, and in which:

Figure 1 is a perspective view of a construction embodying my principle showing the main and auxiliary circuit controls in one extreme position and circuits of a three-light signal controlled by the relay; Fig. 2, is a view similar to Fig. 1, except that the controls are shown in a mid position; Fig. 3, is a view similar to Fig. 1, except that the controls are shown in the other extreme position.

1, is an oscillatable member or head-piece the two ends of which are insulated from each other in any approved manner as by the strips 2, which is pivoted at either end in an approved manner as by the pivot pins 3 and 4 and may be connected in any suitable manner so as to be oscillated by the armature shaft of a suitable relay, such for instance, as that shown in the patent granted to Winthrop K. Howe, March 5th, 1912, No. 1,019,047. At right angles and fastened rigidly to the oscillatable member 1 by means of screws 5 and 6 are metallic conducting contact arms 7 and 8.

Arm 7 bears upon its outer end the metallic spring conducting contact fingers 9 and 10. The contact finger 9 is adapted to touch contact 11 when moved upwardly and the contact finger 10 is adapted to touch contact 12 when moved downwardly. Bearing upon and rigidly fastened to contact arm 8 are metallic spring conducting control fingers 19 and 20 which are adapted to at times bear simultaneously against contacts 13 and 14 respectively when the member 1 is in normal mid position.

21 is a rod which passes through and is rigidly fastened to the outer end of contact arm 8 and which also passes freely through slots in the control fingers 19 and 20. At respective opposite ends of rod 21 are fixed the washers 22 and 23 which limit the outward movement of fingers 19 and 20. The space between the outer operative faces of the two auxiliary control fingers 9, 10, is considerably narrower than the space between the outer operative faces of the two main control fingers 19, 20. Fastened rigidly to main control finger 20, is a pneumatic dash-pot cylinder member 25, having a chamber 29, in which may move a piston 26, which is rigidly held to the opposed control finger 19, by a bent rod 27. An air vent orifice 28, is formed in the cylinder 25, at or near its closed end. When the member 1 is in the mid position of Fig. 2, it is balanced by the counterweight 30, which is fastened to member 1 in any convenient manner such as by rod 31, and as will be readily seen, will return said member to its normal mid position after its movement to either extreme position of Figs. 1 and 3. Contacts 11 and 13 are supported by means of member 15 and are insulated from each other by means of insulation strip 17 which is inserted in member 15. Contacts 12 and 14 are supported by means of member 16 which is separated in the same manner as member 15 by means of insulation strip 18.

In Fig. 1 the member 1 is shown moved to the extreme upper position, closing a circuit for lamp 35. This circuit is as follows: positive terminal of battery 37, wire 38, arm 7, contact 9, contact 11, post 32, wire 33, lamp 35, wire 36, and wire 34 to the negative terminal of battery 37. The closing of this circuit causes lamp 35, which is colored green, to be lighted to signify "clear."

In Fig. 3, the member 1 is shown moved to the extreme lower position, closing a circuit for lamp 48. This circuit is as follows: positive terminal of battery 37, wire 38, arm 7, contact 10, contact 12, post 46, wire 47, lamp 48, wire 49, and wire 34 to the negative terminal of the battery 37. The closing of this circuit causes lamp 48, which is colored yellow, to be lighted to signify "caution."

In Fig. 2, the member 1 is shown in the mid position closing a circuit for lamp 44. This circuit is as follows: positive terminal of battery 39, wire 40, post 41, contact 14, contact 20, arm 8, contact 19, contact 13, post 42, wire 43, lamp 44, and wire 45 to the negative terminal of the battery 39. The closing of this circuit causes lamp 44, which is colored red, to be lighted to signify danger.

From the description hereinbefore given, it will be seen that when the circuit controller is in one extreme position, a green lamp is lighted; when the circuit controller is in another extreme position a yellow lamp is lighted; and when the circuit controller is midway between two extreme positions a red lamp is lighted. These lamp colors are respectively indicated by the letters G, Y, R, in all three figures of the drawings. The fact that different color lamps are lighted in the three positions of the circuit controller, can be, as is well understood by those skilled in the signaling art, taken advantage of for the purpose of conveying information to the operator of a train in regard to how he should control that train, and as is well understood by those skilled in the signaling art, a train can, by its mere movement upon the rails of a track, cause the member 1 to assume the three different positions set forth in this description.

One difficulty met in three position circuit controllers is that in passing from one extreme position to the other extreme position, the circuit formed in the mid position of the circuit controller, is momentarily closed, thereby causing an objectionable flash of the "danger" signal light included in that circuit. To fully obviate this serious objection this invention introduces a preventive or retarding device preventing closing of the "danger" lamp lighting circuit during the time interval between passage of the auxiliary control member from either one of its opposed fixed contacts 11, 12, to the other of said contacts for making and breaking the two circuits operating the respective "clear" and "caution" signal lights or devices. Such preventive or retarding device may be variously formed or constructed and it may act pneumatically, mechanically, electrically or otherwise, provided it have the above named preventive or retarding effect upon the compressed or retracted or narrowed main circuit control to temporarily delay its movement to both opposed relatively fixed contacts. The illustrated dash-pot device is merely an example of such a preventive or retarding device and when it is used the piston 26, when the control supporting member 1, is in either extreme position, is forced outwardly in the cylinder 25 by pressure of either control finger 19, or 20, against the respective opposed contact 13, or 14, as shown in Figs. 1 and 3 of the drawings. This forced approach of the control fingers toward each other is sufficient to temporarily prevent them spanning the distance between contacts 13, 14, consequently as the control actuating member 1, moves from one extreme position to the other extreme position the control fingers 19, 20, in passing the mid-position cannot touch both contacts 13, 14, as they are not sufficiently far enough apart to do so, and further, there is not sufficient time for the fingers 19, 20, to move far enough apart to thus touch both contacts 13, 14, because in doing so the piston 26, must be pushed inward nearly or quite to the closed end or head of the dash-pot cylinder 25, and this full piston movement is retarded because of slow escape of air from behind the moving piston through the cylinder vent orifice 28, whereby spanning of the full distance between contacts 13, 14, by the main control fingers 19, 20, cannot be effected in the short time elapsing during movement of the control actuating member 1, from one extreme position to the other, or during the time required for the auxiliary control 9, 10, to pass from either fixed contact 11, 12, to the other of said contacts.

Fig. 1 of the drawings shows that when the circuit controller moves fully upward to one extreme position the circuit through battery 37, to light the green lamp 35, is closed through the auxiliary control finger 9, and contact 11, and the main control is compressed or contracted or narrowed by pressure of its finger 19, upon the contact 13, while its finger 20, does not touch contact 14, thus preventing closing of the red lamp circuit through the other battery 39. Fig. 2, shows that when the controller is in the normal balanced mid-position the main control fingers 19, 20, expand or widen to touch both contacts 13, 14, while the normally narrower auxiliary control fingers 9, 10, are free from both contacts 11, 12, and consequently only the red lamp 44 now will be lighted by closure of its circuit through battery 39, and contacts 13, 14, Fig. 3 shows that when the controller is moved fully downward to its other extreme position the main control is again compressed or narrowed by pressure of its finger 20, upon the contact 14, while its finger 19, does not touch contact 13, thus again preventing closure of the red lamp lighting circuit through battery 39, but now the auxiliary control finger 10, touches contact 12, and thus closes the circuit through the battery 37, for lighting the yellow lamp 48, while both the green and red signal lamps remain unlighted or inoperative.

It is obvious that the support or headpiece member carrying the main and auxiliary circuit controls may have any desired form and may have other than oscillatory movement to cause the attached circuit controls to operate relatively to each other and to their opposed relatively fixed contacts in the manner and for the purposes substantially as hereinabove set forth.

Although I have particularly described the construction of one physical embodiment of my invention, and explained the operation and principle thereof; nevertheless, I desire to have it understood that the form selected is merely illustrative, but does not exhaust the possible physical embodiments of the idea of means underlying my invention.

What I claim as new and desire to secure by Letters Patent of the United States, is:

1. In a circuit controller, in combination: an operating member having two extreme positions and an intermediate position; circuit controlling means governed by said member and operated when said member is in either of said extreme positions; other circuit controlling means governed by said member and operated when said member is in its intermediate position; and means for preventing the operation of said other circuit controlling means when said member moves continuously from either extreme position to the other extreme position.

2. In a circuit controller, in combination: an operating member having an intermediate position and two extreme positions; a circuit controlling device; means governed by said member for preventing the closing of said circuit controlling device in the intermediate position of said member when said member moves continuously from either extreme position to the other extreme position.

3. In a circuit controller, in combination: an operating member having an intermediate position and two extreme positions; circuit controlling means governed by said member; means for coöperating with said circuit controlling means when said member is in its intermediate position; said circuit controlling means having a circuit closing condition in which it can coöperate with said last mentioned means and an ineffective condition, said circuit controlling means having a tendency to assume its circuit closing condition and being automatically governed by said member to assume its ineffective condition when said member is in either of its extreme positions; and means for preventing said circuit controlling means from changing from its ineffective condition to its circuit closing condition until after an elapse of a time greater than the approximate time required for said member to move from either extreme position to the other extreme position.

4. A circuit controller comprising main and auxiliary conductive circuit controls, and an opposed pair of relatively fixed circuit closing contacts for each control, the main control being adapted to engage both of its contacts when the controller is in normal mid-position, said main control also being capable of contraction to then be narrower than the space between its two contacts, combined with means temporarily preventing full expansion of the contracted main control to its opposed contacts while the auxiliary control is passing from either one to the other of its opposed contacts.

5. A circuit controller comprising main and auxiliary conductive circuit controls, and an opposed pair of relatively fixed circuit closing contacts for each control, the main control being adapted to engage both of its contacts when the controller is in normal mid-position, said main control also being capable of contraction by pressure against either one of its opposed contacts to then be narrower than the space between its two contacts, combined with means temporarily preventing full expansion of the contracted main control to its opposed contacts while the auxiliary control is passing from either one to the other of its opposed contacts.

6. A circuit controller comprising main and auxiliary conductive circuit controls, and an opposed pair of relatively fixed circuit closing contacts for each control, the main control being adapted to engage both of its contacts when the controller is in normal mid-position at which time the auxiliary control is disengaged from both of its contacts, said main control also being capable of contraction to then be narrower than the space between its two contacts, combined with means temporarily preventing full expansion of the contracted main control to its opposed contacts while the auxiliary control is passing from either one to the other of its opposed contacts.

7. A circuit controller comprising a movable support, main and auxiliary conductive circuit controls held to said support, and an opposed pair of relatively fixed circuit closing contacts for each control, the main control being adapted to engage both of its contacts when the controller is in normal mid-position, said main control also being capable of contraction to then be narrower than the space between its two contacts, combined with means temporarily preventing full expansion of the contracted main control to its opposed contacts while the auxiliary control moved by the support is passing from either one to the other of its opposed contacts.

8. A circuit controller comprising a movable support, main and auxiliary conductive circuit controls held to said support, and an opposed pair of relatively fixed circuit closing contacts for each control, the main control being adapted to engage both of its contacts when the controller is in normal mid-position, and means balancing the controller in mid-position, said main control also being capable of contraction to then be narrower than the space between its two contacts, combined with means temporarily preventing full expansion of the contracted main control of its opposed contacts while the auxiliary control moved by its support is passing from either one to the other of its opposed contacts.

9. A circuit controller comprising a movable support including two relatively insulated parts, main and auxiliary conductive circuit controls held one to each of said parts, and an opposed pair of relatively fixed circuit closing contacts for each control, the main control being adapted to engage both of its contacts when the controller is in normal mid-position, said main control also being capable of contraction to then be narrower than the space between its two contacts, combined with means temporarily preventing full expansion of the contracted main control to its opposed contacts while the auxiliary control moved by the support is passing from either one to the other of its opposed contacts.

10. A circuit controller comprising main and auxiliary conductive circuit controls, and an opposed pair of relatively fixed circuit closing contacts for each control, the contacts at each side or face of the two controls being respectively held by two binding posts respectively fastened to relatively insulated portions of one fixed support, the main control being adapted to engage both of its contacts when the controller is in normal mid-position, said main control also being capable of contraction to then be narrower than the space between its two contacts, combined with means temporarily preventing full expansion of the contracted main control to its opposed contacts while the auxiliary control is passing from either one to the other of its opposed contacts.

11. In a circuit controller, the main control comprising two resilient fingers, combined with two opposed relatively fixed circuit closing contacts normally engaged by the fingers which are contractible toward each other by pressure against either opposed contact, and means carried by the contracted fingers and at times retarding or temporarily preventing their expansion to both contacts.

12. In a circuit controller, the main control comprising two resilient fingers, combined with two opposed relatively fixed circuit closing contacts normally engaged by the fingers which are contractible toward each other by pressure against either opposed contact, and a dash-pot comprising a vented cylinder held to one finger and a piston held to the other finger and movable in the cylinder thereby retarding expansion of the contracted fingers to both contacts.

13. In a circuit controller: two fixed contacts; electrical conducting resilient contacts electrically connected together positioned between the two fixed contacts and bridging the same; means for causing one of the resilient contacts at times to break contact with one of the fixed contacts, and at times to cause the other resilient contact to break contact with the other fixed contact; and means for preventing the resilient contacts from bridging the fixed contacts during a continuous movement of the resilient contacts from the position in which one resilient contact breaks contact with one fixed contact to a position in which the other resilient contact makes contact with the other fixed contact.

14. A circuit controller comprising main and auxiliary conductive circuit controls, and an opposed pair of relatively fixed circuit closing contacts for each control, the main control being adapted to engage both of its contacts when the controller is in normal mid-position, said main control also being capable of contraction to then be narrower than the space between its two contacts, combined with means temporarily preventing full expansion of the contracted main control to its opposed contacts while the auxiliary control is passing from either one to the other of its opposed contacts, three signal devices, a source of electric energy, means completing two respective circuits from said energy source through the auxiliary control and its two respective contacts to two of said signal devices for independently operating said devices, a second source of electric energy, and means completing a third circuit from said second energy source through the main control and its engaged contacts to the third signal device for independently operating it, substantially as herein set forth.

WINTHROP K. HOWE.